(12) United States Patent
Zhang et al.

(10) Patent No.: US 8,359,416 B1
(45) Date of Patent: Jan. 22, 2013

(54) MULTI-MODE USB-SATELLITE DIGITAL TRANSCEIVER PORT

(75) Inventors: Zhenyu Zhang, Campbell, CA (US); Sheng Lu, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1372 days.

(21) Appl. No.: 11/655,670

(22) Filed: Jan. 19, 2007

Related U.S. Application Data (60) Provisional application No. 60/818,602, filed on Jul. 5, 2006, provisional application No. 60/812,452, filed on Jun. 9, 2006, provisional application No. 60/811,065, filed on Jun. 6, 2006.

(51) Int. Cl.
  *G06F 13/12* (2006.01)
  *G06F 13/38* (2006.01)
(52) U.S. Cl. ............... 710/63; 710/62; 710/72; 710/313
(58) Field of Classification Search .................. 710/313, 710/11, 63
See application file for complete search history.

(56) References Cited

U.S. PATENT DOCUMENTS

| | | | | |
|---|---|---|---|---|
| 6,334,160 | B1 * | 12/2001 | Emmert et al. | 710/11 |
| 6,895,447 | B2 * | 5/2005 | Brewer et al. | 710/11 |
| 7,103,381 | B1 * | 9/2006 | Wright et al. | 455/557 |
| 2003/0229739 | A1 * | 12/2003 | Brewer et al. | 710/105 |
| 2003/0229748 | A1 * | 12/2003 | Brewer et al. | 710/305 |
| 2004/0133722 | A1 * | 7/2004 | Croyle et al. | 710/105 |
| 2004/0143693 | A1 * | 7/2004 | Hwang | 710/305 |
| 2005/0213526 | A1 | 9/2005 | Malkemes et al. | |
| 2007/0239924 | A1 * | 10/2007 | Foo et al. | 710/316 |

* cited by examiner

*Primary Examiner* — Ryan Stiglic (57) ABSTRACT

An interface includes a port and a port control module. The port control module detects whether a remote device communicating with the port is one of a Universal Serial Bus (USB) device and a satellite digital transceiver (DT) device. The port control module selectively generates one of a USB configure signal and a satellite DT configure signal. A USB control module selectively configures the interface to communicate with the USB device when the USB configure signal is received. A satellite control module selectively configures the interface to communicate with the satellite DT device when the satellite DT configure signal is received.

18 Claims, 7 Drawing Sheets

MULTI-MODE USB-SATELLITE DIGITAL TRANSCEIVER PORT

CROSS-REFERENCE TO RELATED APPLICATIONS

This application claims the benefit of U.S. Provisional Application Nos. 60/818,602, filed on Jul. 5, 2006, 60/812,452, filed on Jun. 9, 2006, and 60/811,065, filed on Jun. 6, 2006. The disclosures of the above applications are incorporated herein by reference in their entirety.

FIELD

The present disclosure relates to transceiver ports, and more particularly to a multi-mode transceiver port.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Figure 1:
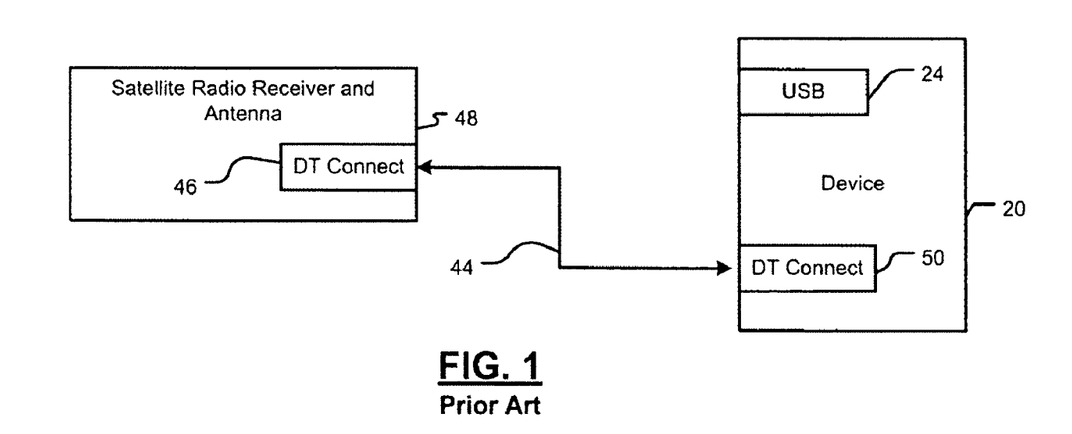
FIG. 1 is a functional block diagram of a satellite receiver and antenna module that is connected by a satellite DT connector to a host device including separate USB and satellite DT port connectors according to the prior art.

Referring now to FIG. 1, host devices 20 such as cellular phones, personal digital assistants (PDAs), MP3 players and other similar devices typically include Universal Serial Bus (USB) port 24. The USB port 24 typically includes four conductors including a VBUS, D+, D− and GND conductors. The USB port 24 may optionally include a fifth conductor for an ID signal. The USB port 24 may operate at various speeds including 1.5 Mb/s (or low speed), 12 Mb/s (or full speed), or 480 Mb/s (or high speed). Low voltage differential signaling (LVDS) signaling may be used on the D+ and D− conductors.

A digital transceiver (DT) connector 44 may be used to connect a DT port 46 of a combined satellite receiver and antenna 48 to a DT port 50 of a satellite-ready device such as the host device 20. The satellite DT connector 44 typically includes four conductors including a VBUS, D+, D− and GND connectors. Low voltage differential signaling (LVDS) signaling is also used on the D+ and D− conductors. The satellite DT connector 44 operates at a different speed (typically 3.0 Mb/s) than USB devices and transmits both data and control signals. Therefore, the host device 20 has separate USB and satellite DT connector ports 24 and 50, respectively, as shown.

SUMMARY

An interface includes a port and a port control module. The port control module detects whether a remote device communicating with the port is one of a Universal Serial Bus (USB) device and a satellite digital transceiver (DT) device. The port control module selectively generates one of a USB configure signal and a satellite DT configure signal. A USB control module selectively configures the interface to communicate with the USB device when the USB configure signal is received. A satellite control module selectively configures the interface to communicate with the satellite DT device when the satellite DT configure signal is received.

In other features, the interface comprises a satellite DT analog transceiver, a car kit analog transceiver, and a USB on-the-go (OTG) analog transceiver. The port control module selectively configures the interface by selecting one of the satellite DT analog transceiver, the car kit analog transceiver, and the USB OTG analog transceiver. A multiplexer communicates with the port. The port control module selectively outputs a select signal to the multiplexer to connect the one of the satellite DT analog transceiver, the car kit analog transceiver, and the USB OTG analog transceiver to the port.

In other features, the port control module initially defaults to at least one of the satellite DT analog transceiver, the car kit analog transceiver, and the USB OTG analog transceiver. The port control module determines that the USB device is present when at least one conductor communicating with the port is pulled high. The port control module determines that the satellite DT device is present by transmitting a command to the satellite DT device and determining whether a response has been received within a predetermined period. The command comprises a mute command.

In other features, a method for controlling an interface includes detecting whether a remote device communicating with a port is one of a Universal Serial Bus (USB) device and a satellite digital transceiver (DT) device. The method also includes selectively generating one of a USB configure signal and a satellite DT configure signal. The method also includes selectively configuring the interface to communicate with the USB device when the USB configure signal is received.

In other features, the method includes selectively configuring the interface to communicate with the satellite DT device when the satellite DT configure signal is received. The method further includes selectively configuring the interface by selecting one of a satellite DT analog transceiver, a car kit analog transceiver, and a USB OTG analog transceiver. The method further includes selectively outputting a select signal to a multiplexer that communicates with the port to connect the one of the satellite DT analog transceiver, the car kit analog transceiver, and the USB OTG analog transceiver to the port.

In other features, the method includes initially defaulting to at least one of the satellite DT analog transceiver, the car kit analog transceiver, and the USB OTG analog transceiver. The method further includes determining that the USB device is present when at least one conductor communicating with the port is pulled high. The method further includes determining that the satellite DT device is present by transmitting a command to the satellite DT device and determining whether a response has been received within a predetermined period. The command comprises a mute command.

In other features, an interface includes port means for connecting. Port control means for controlling detects whether remote means for communicating is one of a Universal Serial Bus (USB) device and a satellite digital transceiver (DT) device. The port control means selectively generates one of a USB configure signal and a satellite DT configure signal. USB control means for controlling selectively configures the interface to communicate with the USB device when the USB configure signal is received. Satellite control means for controlling selectively configures the interface to communicate with the satellite DT device when the satellite DT configure signal is received.

In other features, the interface includes satellite analog means for transmitting and receiving, car kit analog means for transmitting and receiving, and USB on-the-go (OTG) analog means for transmitting and receiving. The port control means selectively configures the interface by selecting one of the satellite analog means, the car kit analog means, and the USB OTG analog means. Means for multiplexing communicates with the port means. The port control means selectively outputs a select signal to the means for multiplexing to connect the one of the satellite DT analog means, the car kit analog means, and the USB OTG analog means to the port means.

The port control means initially defaults to at least one of the satellite DT analog means, the car kit analog means, and the USB OTG analog means.

In other features, the port control means determines that the USB device is present when at least one means for conducting that communicates with the port is pulled high. The port control means determines that the satellite DT device is present by transmitting a command to the satellite DT device and determining whether a response has been received within a predetermined period. The command comprises a mute command.

In still other features, the systems and methods described above are implemented by a computer program executed by one or more processors. The computer program can reside on a computer readable medium such as but not limited to memory, non-volatile data storage and/or other suitable tangible storage mediums. The computer program includes detecting whether a remote device communicating with a port is one of a Universal Serial Bus (USB) device and a satellite digital transceiver (DT) device. The computer program also includes selectively generating one of a USB configure signal and a satellite DT configure signal.

In other features, the computer program includes selectively configuring the interface to communicate with the USB device when the USB configure signal is received. The computer program further includes selectively configuring the interface to communicate with the satellite DT device when the satellite DT configure signal is received. The computer program further includes selectively configuring the interface by selecting one of a satellite DT analog transceiver, a car kit analog transceiver, and a USB OTG analog transceiver.

In other features, the computer program includes selectively outputting a select signal to a multiplexer that communicates with the port. The select signal connects the one of the satellite DT analog transceiver, the car kit analog transceiver, and the USB OTG analog transceiver to the port. The computer program further includes initially defaulting to at least one of the satellite DT analog transceiver, the car kit analog transceiver, and the USB OTG analog transceiver.

In other features, the computer program includes determining that the USB device is present when at least one conductor communicating with the port is pulled high. The computer program further includes determining that the satellite DT device is present by transmitting a command to the satellite DT device. The computer program further includes determining whether a response has been received within a predetermined period. The command comprises a mute command.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
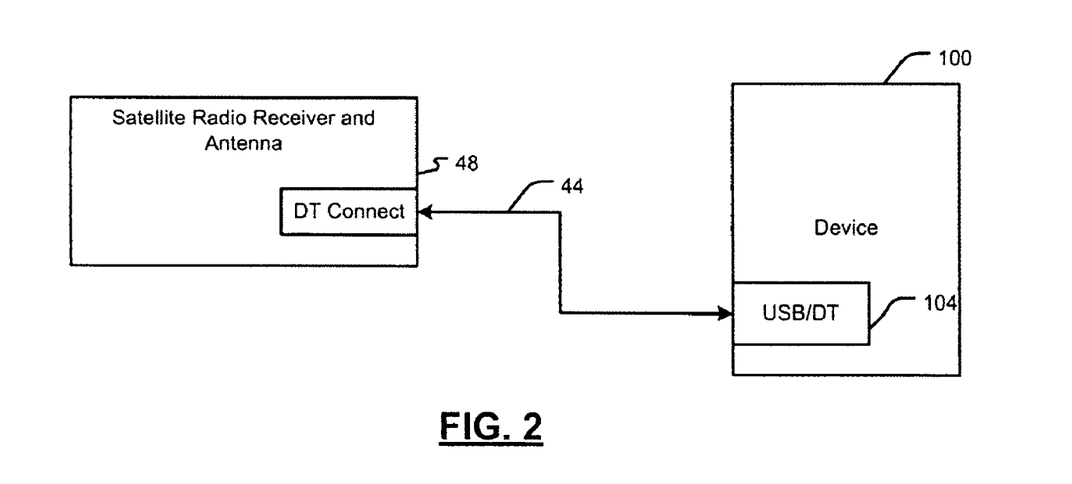
FIG. 2 is a functional block diagram of a satellite receiver and antenna module connected by a satellite DT connector to a host device including a dual mode USB/satellite DT port connector according to the present disclosure.

Referring now to FIG. 2, a satellite receiver and antenna module 48 is connected by a satellite DT connector 44 to a host device 100 including a dual mode USB/satellite DT port 104. In other words, both a USB connector and the satellite DT connector 44 are connected to the same port. The port 104 automatically detects whether a remote device that is being connected to the host device 100 is a USB device or satellite device and selectively configures the port 104 to handle the USB signal or satellite DT signal, as will be described below.

Figure 3A:
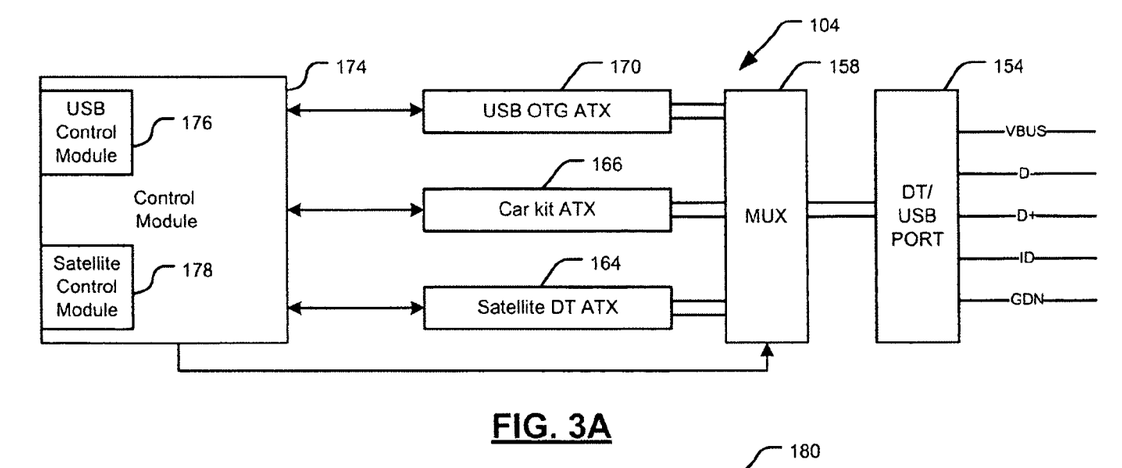
FIG. 3A is a functional block diagram of an exemplary combined USB/satellite DT port according to the present disclosure.

Referring now to FIG. 3A, an exemplary combined USB/satellite DT port 104 is shown in further detail. The port 104 includes a combined USB/satellite DT connector 154, a multiplexer 158, a satellite DT analog transceiver (ATX) 164, a car kit analog transceiver 166, and a USB On-The-Go (OTG) analog transceiver 170. A control module 174 communicates with the transceivers 164, 166 and 170 and selectively outputs a signal to the multiplexer 158 to connect one of the transceivers 164, 166 and 170 to the combined USB/satellite DT port 154. In this implementation, the combined USB/satellite DT port 154 includes four conductors including a VBUS, D+, D− and GND conductors.

The control module 174 selects the transceivers and determines the type of remote device (if any) that is connected. Based on the type of remote device that is connected, a USB or satellite control module 176 or 178 is enabled.

Figure 3B:
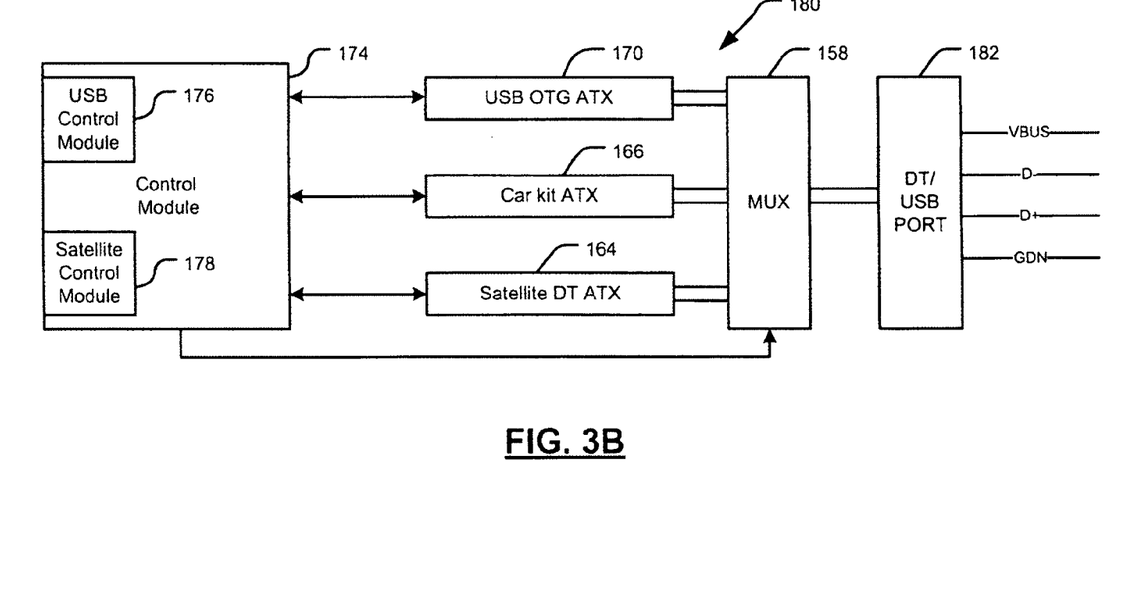
FIG. 3B is a functional block diagram of another exemplary combined USB/satellite DT port according to the present disclosure.

Referring now to FIG. 3B, another exemplary combined USB/satellite DT port 180 is shown. This embodiment is similar to the embodiment shown in FIG. 3A. However, the combined USB/satellite DT connector 154 of FIG. 3B includes conductors including a VBUS, D+, D−, and GND instead of the VBUS, D+, D−, GND and ID conductors of FIG. 3A.

Figure 4:
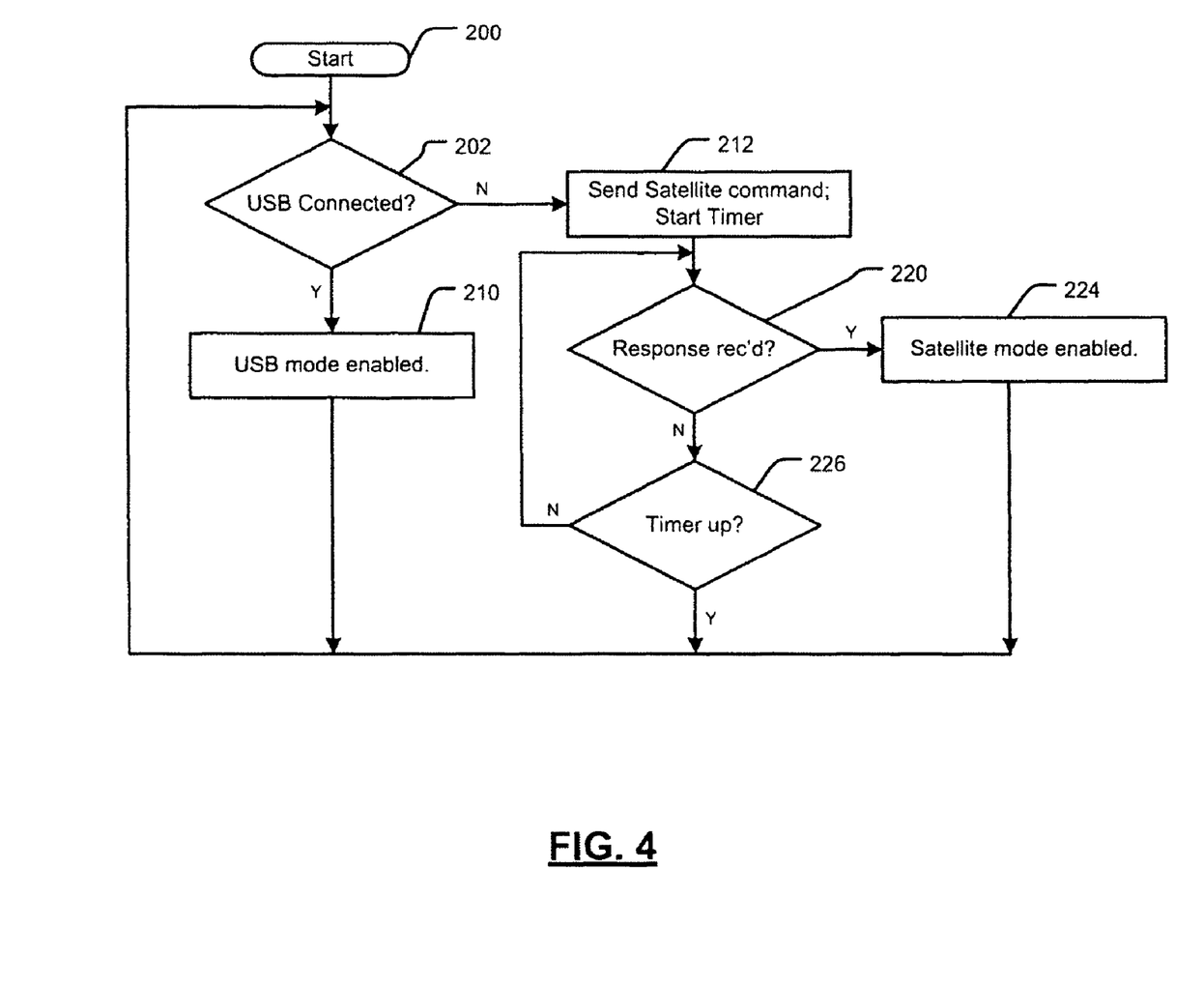
FIG. 4 is a flowchart illustrating steps performed by the combined USB/satellite DT port of FIGS. 3A and 3B.

Referring now to FIG. 4, a flowchart illustrates steps performed by the combined USB/satellite DT ports 104, 180 of FIGS. 3A and 38. Control begins in step 200. In step 202, control determines whether a remote USB device is connected. The control module 174 may initially select the USB transceiver 170 using the multiplexer 158. Then, the control module 174 determines whether a USB device is present. This can be done, for example, by sensing whether one or both of the D+ and D− conductors is pulled high. Typically if a remote USB device is present, one or both conductors may be pulled high. Other methods of sensing a remote USB device may be used.

If a remote USB device is detected in step 202, the USB mode is enabled by the control module 174 in step 210. If step 202 is false, the control module 174 selects the satellite transceiver 164 and sends a satellite command in step 212. For example, the control module 174 may trigger the satellite transceiver 164 to send a satellite mute command. Other commands and/or handshake can be used to detect the remote satellite DT. A timer may be set to detect a response. If a response is received in step 220, the satellite mode is enabled in step 224. If a response is not received and the timer is not up in step 226, control returns to step 220. If the timer is up, control returns to step 202.

There are a number of additional ways to detect remote USB and/or satellite devices in addition to those described above. Furthermore, the satellite transceiver 164 may be initially selected as a default. USB A, USB B and/or USB mini A/B connectors can be used to connect both USB and satellite DT devices.

Figure 5A:
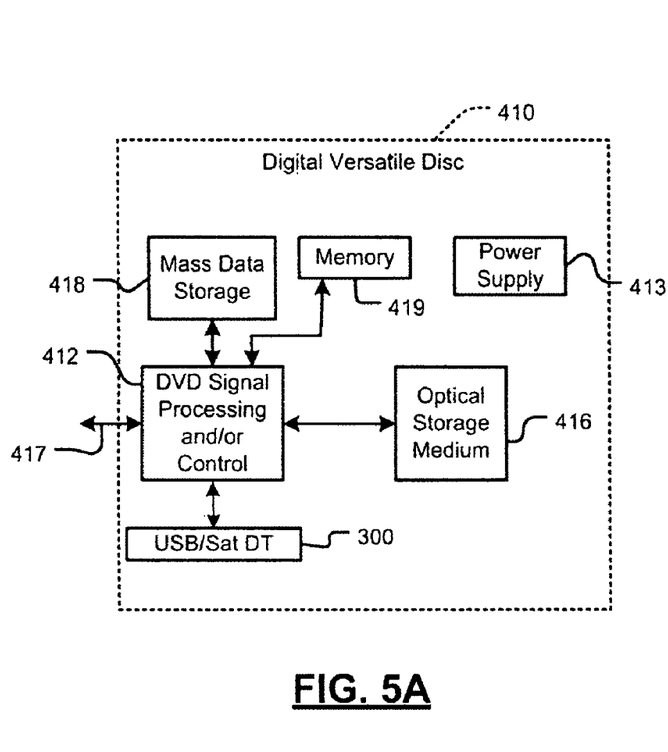
FIG. 5A is a functional block diagram of a digital versatile disc (DVD) including a combined USB/satellite DT port.

Referring now to FIG. 5A, a combined USB/satellite DT port 300 can be implemented in a digital versatile disc (DVD) drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The DVD 410 may be connected to memory 415 such as RAM, ROM, low latency nonvolatile memory such as flash memory and/or other suitable electronic data storage.

Figure 5B:
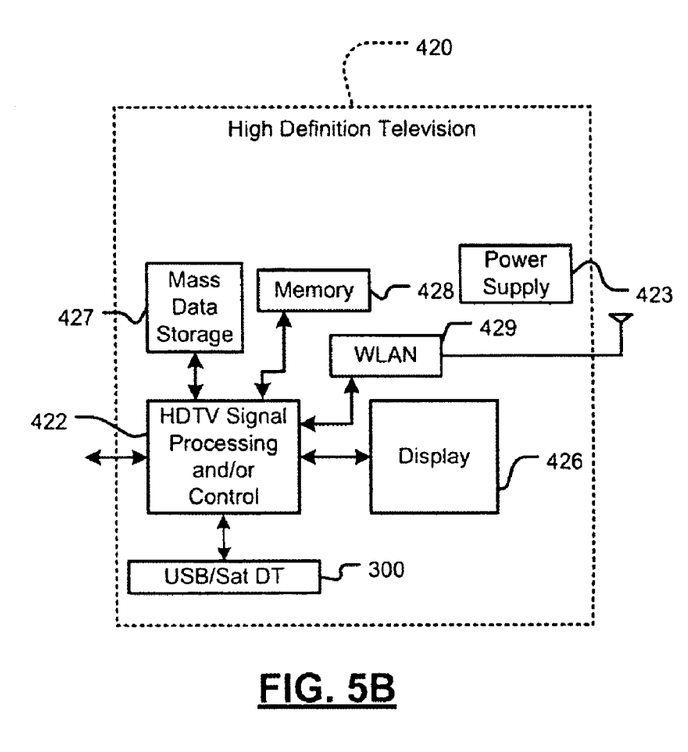
FIG. 5B is a functional block diagram of a high definition television including a combined USB/satellite DT port.

Referring now to FIG. 5B, the combined port 300 can be implemented in a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 425.

Figure 5C:
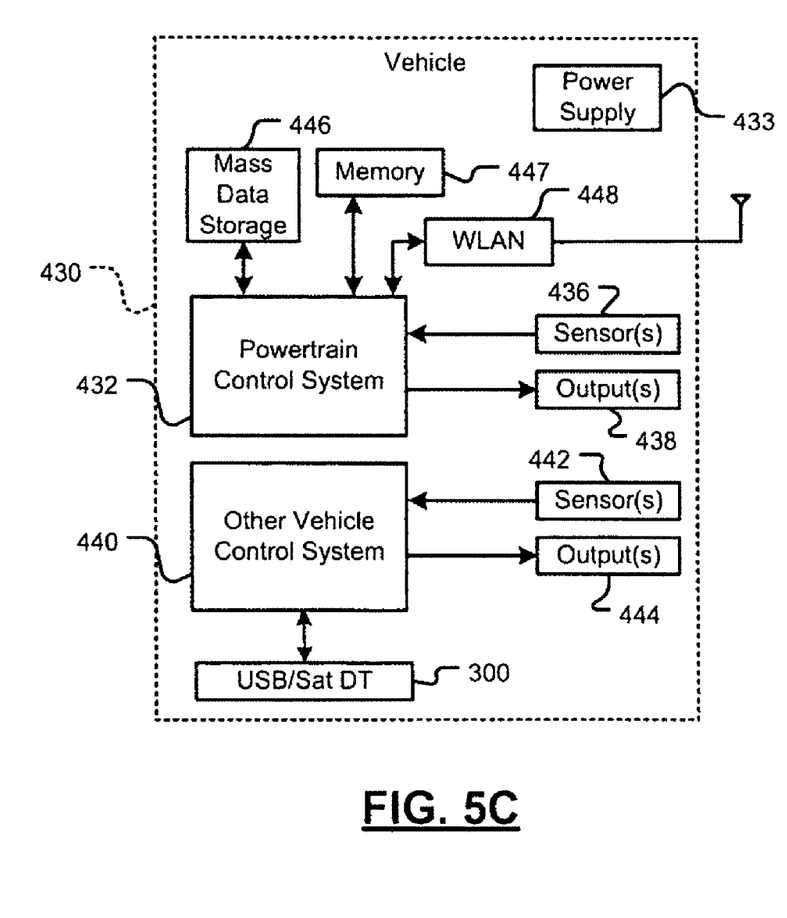
FIG. 5C is a functional block diagram of a vehicle control system including a combined USB/satellite DT port.

Referring now to FIG. 5C, the combined port 300 may implement and/or be implemented in a control system of a vehicle 430. In some implementations, the device implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The device may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 5D:
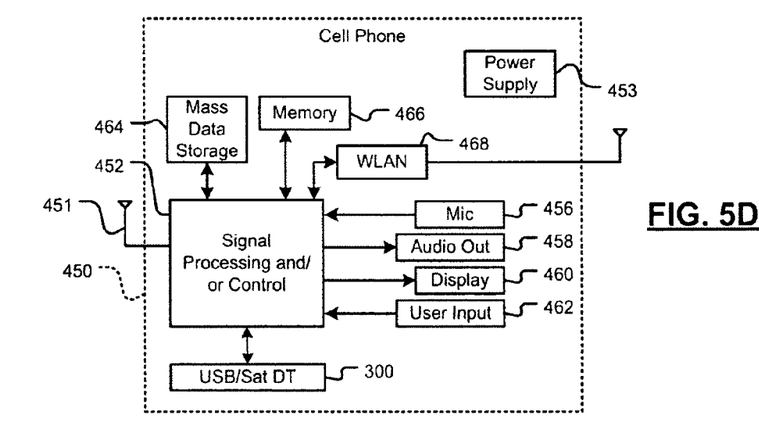
FIG. 5D is a functional block diagram of a cellular phone including a combined USB/satellite DT port.

Referring now to FIG. 5D, the combined port 300 can be implemented in a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 5E:
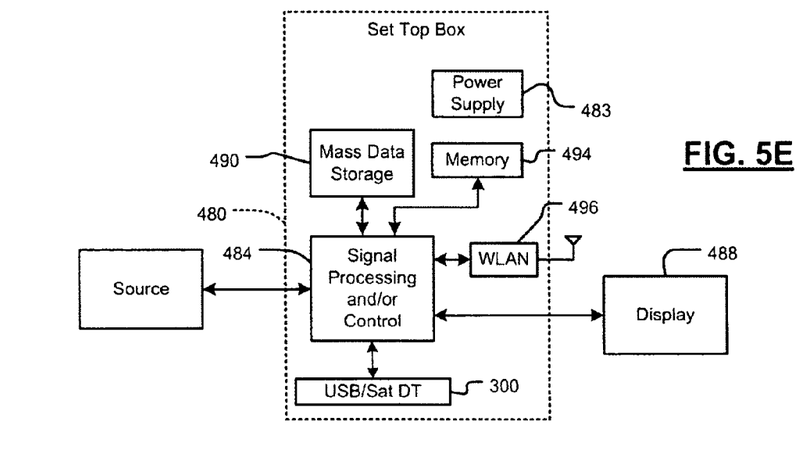
FIG. 5E is a functional block diagram of a set top box including a combined USB/satellite DT port.

Referring now to FIG. 5E, the combined port 300 can be implemented in a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 450 that stores data in a nonvolatile manner. The mass data storage 450 may include optical and/or magnetic storage devices for example hard disk drives HDD and/or DVDs. The HDD may be a mini HDD that includes one or more platters having a diameter that is smaller than approximately 1.8". The set top box 480 may be connected to memory 454 such as RAM, ROM, low latency nonvolatile memory such as flash memory and/or other suitable electronic data storage. The set top box 480 also may support connections with a WLAN via a WLAN network interface 456.

Figure 5F:
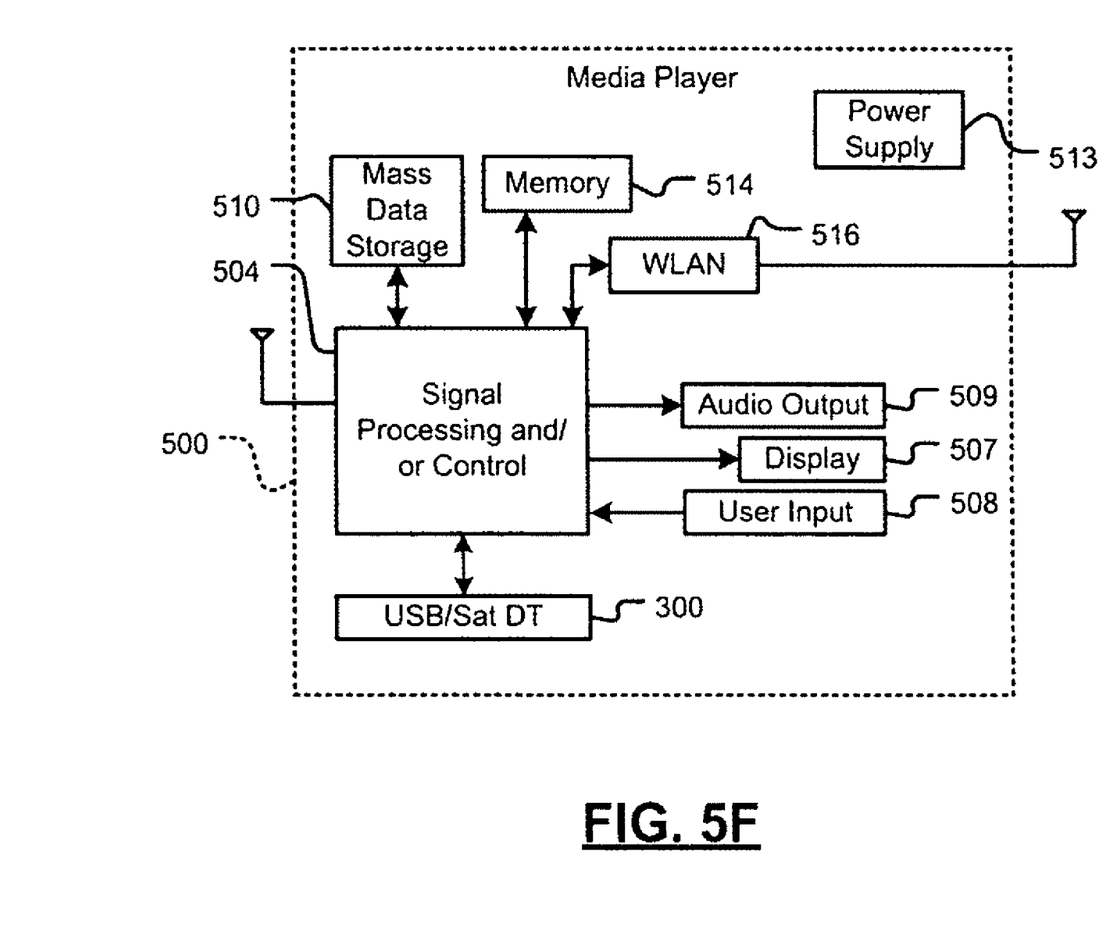
FIG. 5F is a functional block diagram of a media player including a combined USB/satellite DT port.

Referring now to FIG. 5F, the combined port 300 can be implemented in a media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 505 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An interface comprising:
   a port;
   a port control module that detects whether a remote device communicating with said port is one of a Universal Serial Bus (USB) device and a satellite digital transceiver (DT) device and that selectively generates one of a USB configure signal and a satellite DT configure signal;
   a satellite DT analog transceiver;
   a car kit analog transceiver; and
   a USB on-the-go (OTG) analog transceiver,
   wherein said port control module selectively configures the interface by selecting one of said satellite DT analog transceiver, said car kit analog transceiver, and said USB OTG analog transceiver,
   wherein said port control module initially defaults to at least one of said satellite DT analog transceiver, said car kit analog transceiver, and said USB OTG analog transceiver, and
   wherein said port control module determines that said satellite DT device is present by transmitting a command to said satellite DT device and determining whether a response has been received within a predetermined period.

2. The interface of claim 1 further comprising a USB control module that selectively configures said interface to communicate with said USB device when said USB configure signal is received.

3. The interface of claim 1 further comprising a satellite control module that selectively configures said interface to communicate with said satellite DT device when said satellite DT configure signal is received.

4. The interface of claim 1 further comprising a multiplexer that communicates with said port, wherein said port control module selectively outputs a select signal to said multiplexer to connect said one of said satellite DT analog transceiver, said car kit analog transceiver, and said USB OTG analog transceiver to said port.

5. The interface of claim 1 wherein said port control module determines that said USB device is present when at least one conductor communicating with said port is pulled high.

6. The interface of claim 1 wherein said command comprises a mute command.

7. A method for controlling an interface comprising:
   detecting whether a remote device communicating with a port is one of a Universal Serial Bus (USB) device and a satellite digital transceiver (DT) device;
   selectively generating one of a USB configure signal and a satellite DT configure signal;
   selectively configuring the interface by selecting one of a satellite DT analog transceiver, a car kit analog transceiver, and a USB OTG analog transceiver;
   initially defaulting to at least one of said satellite DT analog transceiver, said car kit analog transceiver, and said USB OTG analog transceiver;
   determining that said satellite DT device is present by transmitting a command to said satellite DT device; and
   determining whether a response has been received within a predetermined period.

8. The method of claim 7 further comprising:
   selectively configuring the interface to communicate with said USB device when said USB configure signal is received.

9. The method of claim 7 further comprising:
   selectively configuring the interface to communicate with said satellite DT device when said satellite DT configure signal is received.

10. The method of claim 7 further comprising:
    selectively outputting a select signal to a multiplexer that communicates with said port to connect said one of said satellite DT analog transceiver, said car kit analog transceiver, and said USB OTG analog transceiver to said port.

11. The method of claim 7 further comprising:
    determining that said USB device is present when at least one conductor communicating with said port is pulled high.

12. The method of claim 7 wherein said command comprises a mute command.

13. An interface comprising:
port means for connecting;
port control means for detecting whether a remote device that communicates with said port means is one of a Universal Serial Bus (USB) device and a satellite digital transceiver (DT) device and for selectively generating one of a USB configure signal and a satellite DT configure signal;
satellite DT analog means for transmitting and receiving;
car kit analog means for transmitting and receiving; and
USB on-the-go (OTG) analog means for transmitting and receiving,
wherein said port control means selectively configures the interface by selecting one of said satellite DT analog means, said car kit analog means, and said USB OTG analog means,
wherein said port control means initially defaults to at least one of said satellite DT analog means, said car kit analog means, and said USB OTG analog means
wherein said port control means determines that said satellite DT device is present by transmitting a command to said satellite DT device and determining whether a response has been received within a predetermined period.

14. The interface of claim 13 further comprising USB control means for selectively configuring the interface to communicate with said USB device when said USB configure signal is received.

15. The interface of claim 13 further comprising satellite control means for selectively configuring the interface to communicate with said satellite DT device when said satellite DT configure signal is received.

16. The interface of claim 13 further comprising multiplexing means for multiplexing that communicates with said port means, wherein said port control means selectively outputs a select signal to said multiplexing means to connect said one of said satellite DT analog means, said car kit analog means, and said USB OTG analog means to said port means.

17. The interface of claim 13 wherein said port control means determines that said USB device is present when at least one conducting means for conducting that communicates with said port is pulled high.

18. The interface of claim 13 wherein said command comprises a mute command.

* * * * *